United States Patent Office 3,473,288
Patented Oct. 21, 1969

3,473,288
PACKAGING MACHINE
Hiroshi Nakamura and Shiro Nanmo, Tokyo, Yasutaro Ishizaki, Ichikawa-shi, Tokuji Saito, Iwakura-machi, and Kin Kato, Uotsu-shi, Japan, assignors to Nippon Carbide Kogyo Kabushiki Kaisha, Tokyo, Japan, a corporation of Japan
Filed Aug. 1, 1967, Ser. No. 657,695
Claims priority, application Japan, Aug. 12, 1966, 41/52,633; Feb. 7, 1967, 42/7,448
Int. Cl. B65b 9/06, 51/30; B65g 47/06
U.S. Cl. 53—58                                          13 Claims

ABSTRACT OF THE DISCLOSURE

An automatic packaging machine is operable to receive an article to be packaged and introduce it into a hollow form of wrapping material such as a film of thermoplastic material and subsequently seal the wrapping material in a longitudinal and transverse direction with the article therein. The machine may be readily adjusted to package articles of different lengths and a conveyor means is operable to provide automatic and continuous packaging of the articles. A cutting and sealing unit having a pair of upper and lower dies is operable to form a pair of closely spaced parallel transverse seals in the package and to cut the package material between the transverse seals.

---

The invention relates to an automatic packaging machine of the type wherein an article to be packed is introduced into a hollow form of wrapping material, such as a film of thermoplastic material, which is subsequently sealed in the longitudinal and transverse directions to confine the article therein. The invention also relates to conveyor means for associated use with such machine.

In certain applications, it is desirable that a packaging operation can be adjusted to varying length of articles. For example, textile fabrics are usually offered for sale in the form of rolls of folded pieces of cloth and such products may have several different widths or lengths.

Therefore, it is an object of the invention to provide an automatic packaging machine which permits varying the length of packages in a simple manner.

The prior art automatic machine required the articles to be supplied at regular intervals. When the supply rate deviates from a present value, for example, exceeds the latter, accumulation of articles may occur at the feeder or at the inlet of the packaging machine to foul its operation. When this occurs, the operation of the packaging machine must be stopped for manually removing the excessive supply, which results in reduction of operational efficiency.

Therefore, it is another object of the invention to provide a novel conveyor means which supplies the packaging machine with articles to be packed at such rate that does not disturb its operation and without requiring any particular attention of operating personnel.

It is still anoher object of the invention to provide a combined feeder mechanism and packaging machine which permits automatic and continuous packaging of articles supplied to the feeder mechanism at relatively random rate.

In accordance with the invention, the packaging machine comprises an endless conveyor belt running around a pair of drive rollers, and a transmission assembly for imparting rotary motion from a motor to the drive roller. The transmission assembly includes a clutch, a transmission or reference shaft which is driven by the motor when the clutch becomes operative, and a cross-bar secured to the shaft and having a longitudinal slot formed therein for receiving a bolt, the belt being connected through a oneway clutch to a chain and chain wheel system for driving the endless conveyor belt. The arrangement is such that the amount of movement imparted to the conveyor belt is determined by the distance of the bolt from the axis of the transmission shaft. The packaging machine further includes a photo-conductive cell adjustably positioned adjacent to one end of the conveyor belt which lies nearer to the article inlet to the machine. The photoconductive cell is adapted to normally receive light from an opposite light source, but an article supplied intercepts the light path, the corresponding change in its output serves to actuate the clutch of the transmission assembly, thereby causing the start of a packaging operation. When the article is forwardly fed a predetermined extent, the clutch is deenergized by a limit switch which is operated by a cam rotated by the shaft.

A package is formed by a former placed in the path of movement of the article to the conveyor belt from its preceding stage, which may be called a feeder. The former comprises an open-ended, hollow body of generally parallelopiped form having a flat extension at its top level with a notch formed between the extension and the body. The top plate of the body has an inward, V-shaped notch to facilitate forming a flat web of wrapping material as supplied from a roll into a continuous parallelopiped with both sides of the web held in overlapping relationship at the top. The above mentioned extension of the former serves as a support for the top part of the parallelopiped blank package, and a heat-sealing unit is positioned above the former and rotatably carries a heat sealer roller which presses the overlapping parts of the web against the flat extension to produce a longitudinal seal of the package as it is carried on the conveyor belt.

The transmission assembly imparts an intermittent drive to the conveyor belt in such a manner that the latter is permitted to convey the article to a position where its forward end, after a predetermined amount of travel, comes to rest adjacent to the end of the conveyor belt. Another conveyor belt is arranged at a distance spaced apart from, but in horizontal alignment with the first mentioned conveyor belt, and in the space between these conveyors there is arranged a cutting and sealing unit which comprises a pair of upper and lower dies, these dies being actuated from the transmission shaft through a cam plate and linkage.

The feeder mechanism according to the invention comprises essentially a third endless conveyor belt running around a pair of drive rollers. One of the drive rollers is securely mounted on a driving shaft which is alternately driven from a second motor associated with feeder mechanism or from the motor of the packaging machine through the above mentioned transmission assembly. To this end, the driving shaft has mounted thereon first and second chain sprocket wheels, which are connected through link belts with the second motor and with the transmission assembly of the packaging machine, respectively. The first chain sprocket is provided with a pawl and ratchet mechanism for connection with the driving shaft and the arrangement is such that although the drive from the second motor is effectively transmitted to the shaft, the first sprocket freely rotates when the shaft is driven from the transmission assembly of the packaging machine. A similar pawl and ratchet mechanism is also provided in the second sprocket or in a sprocket wheel which is provided between the second sprocket and the transmission assembly, and allows the third conveyor belt to be driven from only the second motor when the transmission assembly is not operative. This arrangement prevents articles from being oversupplied to the packaging machine.

The above and other objects, features and advantages of the invention will become apparent from the following description of the embodiments thereof shown in the drawing, wherein.

Figure 1:
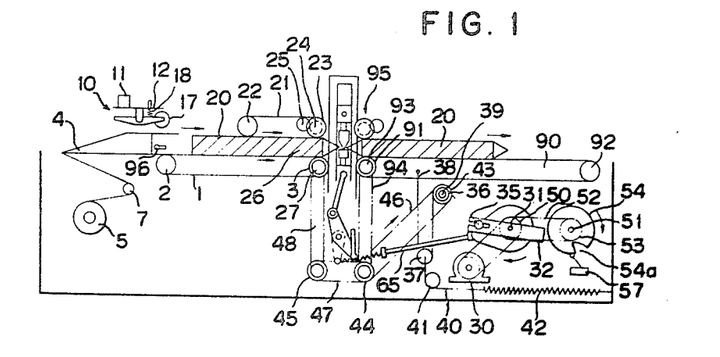
FIG. 1 is a schematic elevation of one embodiment of the packaging machine according to the invention.
Figures 1A, 2, 3:
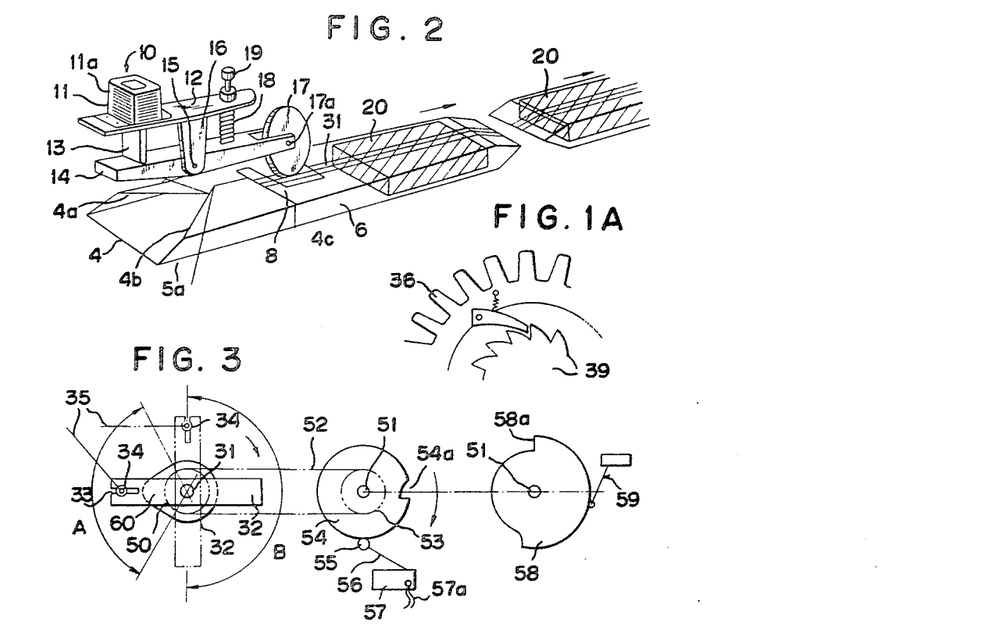
FIG. 1A is a fragmentary cross-section of a one-way clutch used in the packaging machine of FIG. 1.
FIG. 2 is a perspective view of a part of the machine, illustrating the former and the longitudinal sealing device.
FIG. 3 is a schematic diagram of the transmission assembly for illustrating its operation.

Referring to the drawing, and particularly FIGS. 1 and 2, there is shown an endless conveyor belt 1 of substantial-width which runs around a pair of rollers 2 and 3. A former 4 is arranged at the inlet of the packaging machine to form a plastic web supplied from a roll 5 into a blank of package 6 (FIG. 2). As shown in FIG. 2, the former 4 is generally of open-ended, parallelopiped form and its top plate has a pair of inclined edges 4a and 4b. When the machine is initially set, the web is manually drawn off the roll 5, passed around a guide roller 7 and its free end is introduced into the parallelopiped former. The web has a width which is more than twice the width of the former, so that when the end portion of the web enters the former, both its sides are folded inwardly by the side and top walls of the former to thereby overlap each other. The roll 5 is mounted to be rotatable under the pulling action upon the web of the force applied by an article placed in the blank package and driven by the conveyor belt 1. During initial mounting, the free end of the blank package is pulled through the former, and its top part is passed over a flat extension 4c which lies at the same level as that of the top plate of the former, a notch 8 being provided between the extension and the top plate of the former for passage of the top part of the package therethrough. When the web is thus set in and through the former 4, the latter maintains such shape of the web during subsequent operation by cooperation with the tension in the web. In FIG. 2, a web 5a is shown to be turned outwardly along the edges 4a and 4b under such tension.

A sealing device, generally shown at 10, is positioned above the former 4 and comprises a solenoid 11 mounted on a support plate 12 which is rigidly secured to the machine frame. The solenoid has its core 13 integrally connected with one end of a lever 14 pivoted at 15 to a bracket 16 extending from the support plate 12. The other end of the lever 14 carries a heat-sealing roller 17 so as to be freely rotatable and the lever 14 is urged downward, when the solenoid is not energized, by a coiled compression spring 18 wound around a bolt 19 secured to the support plate, thereby pressing the overlapping parts of the web against the extension 4c of the former and heat-sealing these parts together. The roller 17, when thus urged downward, follows the motion of the web and rotates at a peripheral speed which is of same magnitude as the linear speed of movement of the web. The roller is a conventional heat roller including a nichrome wire. To give an example, the roller is formed to have a channel-shaped profile which surrounds a radial array of electric heaters supported by a pivot 17a and the roller is rotatably carried by the pivot through bearing means. It will be apparent that entry of an article to be packed into the blank package is greatly facilitated by an inward, V-shaped notch formed by the edges 4a and 4b. The former may have any desired size depending upon the maximum article size which the machine is intended to package.

To provide a correct amount of feed to an article 20, another endless conveyor belt 21 is positioned above the conveyor belt 1 and runs around a pair of rollers 22 and 23. These rollers are vertically adjustable so that the lower span of the belt 21 may engage the top of the package and drive it at the same speed as the belt 1. To this end, the roller 23 has mounted on its shaft a gear 24 which meshes with a gear integral with a sprocket wheel 25 which is engaged by a link belt 26, the link belt 26 also engaging with a sprocket wheel 27 mounted on the shaft of the drive roller 3.

In order to drive the conveyor belts 1 and 21 at a predetermined speed, there is mounted a motor 30 in the housing of the machine. The output shaft of the motor is connected to a transmission or reference shaft 31 through an electromagnetic clutch, which is not shown for simplicity of the drawing, but which may be any other known clutch. A cross-bar 32 is rigidly secured to the transmission shaft 31 as by providing a circular bore in the cross-bar through which the shaft extends and by keying the cross-bar to the shaft. The cross-bar 32 has formed therein a longitudinal slot 33 which receives a bolt 34 having an enlarged head. The bolt is clamped at a selected position in the slot by its mating nut. Alternatively, the bolt may be replaced by a nut having a hexagonal profile which fits and slides in the longitudinal slot having a hexagonal cross-section by rotation of a screw bolt rotatably but non-slidably held in the slot and engaging with the nut. To the head of the bolt 34 is connected one end of a chain belt 35 which is passed around a sprocket wheel 36 and another sprocket wheel 37 before being secured to the machine frame at 38. The wheel 36 is mounted on a shaft 39 through a pawl and ratchet mechanism of the type shown in FIG. 1A and the arrangement is such that although the clockwise rotation of the wheel 36 is effective to drive the shaft 39, the wheel 36 is free to rotate counter-clockwise. Thus the pawl and ratchet mechanism incorporated in the wheel 36 constitutes a one-way clutch. The wheel 37 is free to move up and down as the wheel 36 is driven by the link belt 35 clockwise and counter-clockwise, respectively. To the wheel 37 is attached a belt 40 which passes around a stationary pulley 41 and which is connected at its other end to one end of a return spring 42, the other end of the spring 42 being connected to the machine frame. On the shaft 39 is mounted a chain sprocket wheel 43 which together with two other similar chain sprockets 44 and 45 and link belts 46, 47 and 48 constitutes an intermediate chain and chain sprocket system for transmitting the rotary motion of the eccentric bolt 34 to the conveyor belts 1 and 21.

The reference shaft 31 has a chain sprocket 50 mounted thereon for simultaneous rotation of a control shaft 51 through driving engagement of a link belt 52 with the sprocket 50 and with a corresponding sprocket 53 mounted on the control shaft 51. The sprocket wheels 50 and 53 have same radius so that the rotation of the control shaft 51 is synchronized with that of the reference shaft 31. A control cam 54 is carried by the control shaft 51 and has a notch 54a formed in a part of its periphery. A roller 55 carried by an arm 56 is urged against the periphery of the control cam 54 as by spring loading and when the roller rides on the notch 54a, a limit switch 57 is opened by the arm 56. Leads 57a of the limit switch are connected in the circuit which controls energization or deenergization of the aforementioned electromagnetic clutch which transmits power from the motor 30 to the transmission or reference shaft 31. Another cam plate 58 having a step 58a is also secured to the control shaft 51, this cam plate being shown in FIG. 3 on a separate shaft for convenience of illustration. The cam plate 58 is engaged by a roller and limit switch assembly, generally shown at 59 and of similar construction as the parts 55 to 57. As shown, the roller of the assembly 59 is positioned at an angular position nearly but slightly less than 90° in advance of the roller 55, as viewed in the direction of rotation of the control shaft 51, that is, clockwise.

The transmission shaft 31 also carries a cam plate 60 (FIG. 4) non-rotatably. The cam plate has an oval-shaped, annular groove 61 formed therein and a lateral projection 62 of a follower number 63 is held snug fit in the groove. The follower member 63 has an elongated opening 64 of such width that the transmission shaft 31 is sliding fit therein. During rotating of the shaft 31, the projection 62 remains in the groove 61 as the latter rotates, so that the member 63 undergoes radial rocking motion. A link rod 65 is connected at its one end with the follower member 63 and is threaded at its other end portion. A pair of nuts 66 and 67 engage with the threaded portion of the rod 65 and a compression spring 68 extends between the nut 66 and a sleeve 69 which normally abuts against the nut 67. The sleeve 69 is pivotally attached with a laterally extending lug 70 which is secured to a stationary pivot 71 for a lever 72 and also to the lever. The pivot 71 is rotatably, but stationarily supported by bearings not shown and extends to the opposite side of the conveyor belt 1 for transmitting same rocking motion to a corresponding lever provided at said opposite side as that imparted to the lever 72. One end of the lever 72 is pivotally connected through a link 73 to the lower part of a support 74 for a lower die 75, and the other end of the lever 72 is also pivotally connected to a link 76, which slidably carries a sleeve 77 connected, by a shaft 78, to a support 79 for an upper die 80. The shaft 78 extends substantially the width of the conveyor belt 1 and is connected to the counterpart of the sleeve 77 provided on the opposite side of the belt and engaging with the counterpart of the link 76, thereby assuring positive guide and drive to the upper die. A similar interconnection is provided for the support 74 of the lower die. Specifically, a link corresponding to the link 73 is connected to the counterpart of the lever 72 and is secured to the support 74 from the opposite side thereof. The link 76 has a threaded free end engaged by a nut 81 and a compression spring 82 extends between the nut 81 and the sleeve 77. The supports 74 and 79 are received within a vertical compartment 83 for sliding movement therein and the compartment has a pair of opposing openings 84 and 85 provided in its side walls for allowing passage of the article and package 20 therethrough.

Referring again to FIG. 1, there is provided another conveyor belt 90 at a distance spaced apart from, but at the same level as the conveyor belt 1. The belt 90 runs around a pair of rollers 91 and 92, the roller 91 being shown to have an integral chain sprocket 93 which is driven by the sprocket wheel 44 through a link belt 94. A belt and roller system, only partly shown and designated generally at 95, is spaced above the conveyor belt 90 to ensure positive feed of the package. Its construction and drive is similar to the previously mentioned belt and roller system 21 to 23 driven through parts 24 to 26. Finally, in accordance with the invention, a photoconductive cell 96 is adjustably positioned adjacent to the outlet of the former 4 on one side of the conveyor belt 1, and a light source not shown is arranged on the other side of the conveyor belt 1 in correct lateral alignment with the cell 96. The arrangement of the photoconductive cell and its associated light source is such that normally the photocell is irradiated by the light source, but when an article 20 intercepts the light path, a corresponding change in the impedance of the photoconductive cell is utilized to actuate the clutch which couples the transmission shaft 31 with the output shaft of the motor 30.

In operation, the motor 30 is set in motion and kept running at a constant speed during the time when the packaging machine operates. Assuming that an article 20 supplied by the preceding step or feeder has reached a position where it intercepts the light patch to the photoconductive cell 96, then the aforementioned clutch transmits power from the motor 30 to the transmission shaft 31, whereby the crossbar 32 starts to rotate, with consequence that the link belt 35 fastened to the eccentric bolt 34 is pulled to the right, as viewed in FIG. 1, to thereby rotate the sprocket wheel 36 clockwise. The one-way clutch, previously described, which is constituted by the pawl and ratchet mechanism incorporated in the sprocket wheel 36, effectively transmits its rotating motion to the shaft 39, and therefore, the conveyor belts 1, 21 and 90 are driven through the intermediate chain and chain sprocket system with a speed pattern which is determined by the radius of eccentricity of the bolt 34 from the axis of the reference shaft 31. Specifically, the length of the link belt 35 between the bolt 34 and the sprocket 36 will vary between its minimum and maximum values during half a revolution of the shaft 31. During the next half revolution of the shaft 31, this length will decrease and the amount of such decrease will be absorbed by the falling sprocket 37 which is urged downward by the return spring 42. Therefore, it is essential that rotation of the shaft 31 and the cross-bar 32 starts at a predetermined angular position. This is accomplished by resetting the clutch associated with the transmission shaft 31 so that the shaft stops at a predetermined angular position where the bolt 34 lies nearest to the sprocket wheel 36. The resetting operation is provided by the limit switch 57.

Referring to FIG. 3, there is shown the relative relationship between the transmission assembly and the control cam. In the position of various parts shown in this figure, the packaging machine is in its second phase of operation; namely, the article 20 has already been fed a predetermined extent on the conveyor belt 1 with its forward end lying stationarily adjacent to the cutting and sealing station, and the pair of dies 75 and 80 has been moved their full stroke in a manner to be described hereinafter. During the time when the shaft 31 and hence the cross-bar 32 subsequently rotate 90° to a position shown in broken lines, the dies are moving away from each other. At the same time, the cam plate 54 rotates 90° clockwise, whereby the notch 54a comes to engage with the roller 55 and the limit switch 57 is turned off by the step 54a. When this occurs, the clutch associated with the transmission shaft 31 is deenergized and the machine operation is stopped. The mounting of the cross-bar 32 and the control cam is chosen such that when the notch 54a engages the roller 55, the shaft 31 and hence the cross-bar 32 stop with the bolt 34 lying at its position nearest to the sprocket wheel 36. In FIG. 1, the transmission assembly is shown at the state toward the end of an operation cycle, namely, shortly before the machine is stopped.

The next cycle is initiated when another article 20 has passed through the former 4 and intercepts the photoconductive cell 96. The cell 96 operates the clutch which in turn drives the transmission shaft 31 and the control shaft 51. The article 20 is forwardly fed by the conveyor belts 1 and 21 during rotation of the shaft 31 by 180° from its starting point. Shortly after the start of this rotation, the step 58a of the cam plate 58 actuates the limit switch 59. This switch has normally closed contacts which are connected through leads 11a of the solenoid 11 to a power source not shown, but when the switch is actuated by the step 58a, its contacts are broken so that the solenoid is deenergized and therefore, the heat-roller 17 is pressed down against the package on the extension 4c under the action of the compression spring 18. The overlapping parts of the wrapping web is heat-sealed longitudinally as the article and its surrounding blank packages is driven forward by the conveyor belts. Toward the end of 180° rotation of the shaft 31, the bolt 34 is reaching its position which is most remote from the sprocket wheel 36 and so the latter slows down. After the bolt has passed this position, its further rotation does not provide any drive to the conveyor belts, but only serves to reset the chain belt system 35 to 42 with the sprocket wheel 36 freely rotating on its shaft 39 in an opposite direction. During this phase of operation, the roller of the assembly 59 rides on the portion of the cam plate 58 which has a larger radius, so that the solenoid 11 is again energized to lift the heat-roller 17 from its contact with the blank package.

Figures 4, 5:
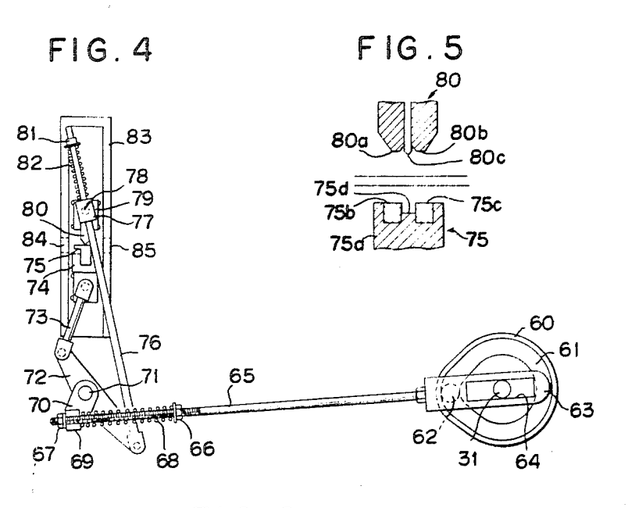
FIG. 4 is an elevation of the cutting and sealing unit.
FIG. 5 is a cross-section of the cutting and sealing dies.

Now referring to FIGS. 3 and 4, the operation of the cutting and sealing station will be described. In FIG. 4, it will be noted that the annular groove 61 of the cam plate 61 is generally circular, but is partly deformed to be of oval shape so that it is spaced here a greater distance from the shaft 31 than the remaining portion. The range where the groove is spaced to a greater distance is indicated in FIG. 3 by an arc designated by reference character A, while reference character B denotes the extent of the forward feed. FIG. 3 also shows that the cam plate 60 is mounted on the shaft 31 with the center line of the range A, where the groove 61 is most spaced from the shaft 31, being in alignment with the cross-bar 32, although the correct positioning depends on the shape of the groove 61. However, with the arrangement shown in FIG. 3, at a short interval after the article 20 on the conveyor belt 1 has come to rest, the follower member 63 begins to be moved outward or to the left, as viewed in FIG. 4, and it occupies the position shown in this figure when the cam 60 reaches the position shown in FIG. 3. The radial rocking motion of the member 63 is imparted to the lug 70 through the rod 65, spring 68 and the sleeve 69, and the net effect of this is to move the lever 72 into a relatively vertical position to thereby move the supports 74 and 79 toward each other through linkage 72, 73 and 76. After the upper and lower dies 75 and 80 have engaged, further movement of the rod 65 is permitted by its moving through the sleeve 69 while the latter retains the dies in their innermost position under the action of the compression spring 68. The spring 82 provide for adjustment of pressure acting between the dies. During further rotation of the cam plate 60, the dies are moved away from each other. Thus it will be understood that during the second phase of operation as represented by the range A of FIG. 3, the wrapping web material between two adjacent articles which is placed between the dies through the openings 84 and 85 may be processed by the dies to form a pair of transverse seals. The detail of these dies will be described below, but it is sufficient here to describe that they cut the web material between these transverse seals, thereby producing an individual package enclosing an article. When the shaft 31 further rotates and the cross-bar 32 reaches the position shown in broken lines in FIG. 3, the limit switch 57 is momentarily turned off by the notch 54a, so that unless another article has reached a position to actuate the photoconductive cell 96 by that time, the clutch remains deenergized to stop the machine and the heat-roller remains in its lifted position. This completes one cycle of operation of the packaging machine. It will be appreciated that during the first phase of the cycle when the article which actuated the photoconductive cell 96 is being carried by the conveyor belts, the preceding article is simultaneously carried by them to pass through the openings 84 and 85 in the compartment 83 onto the belt 90, the dies being held apart at this time.

Referring to FIG. 5, the construction of the dies 75 and 80 is shown in cross-section. The upper die 80 has a pair of coplanar plateaus 80a and 80b separated by an inverted V-shaped recess, from which a knife 80c having a cutting edge extends. The body of the upper die may be made from aluminium, its alloy, copper alloy or other suitable metals. The knife may be a snug fit in the corresponding slot in the body, or may be secured to the body by set screws. In the latter case, the body may comprise two parts, each having one plateau 80a or 80b. The knife 80c is fixed so that its cutting edge extends about 0.5 to 1 mm. beyond the plane defined by the plateaus. The lower die 75 comprises a body 75a having a pair of rectangular grooves in which heat-resistant blocks 75b and 75c are seated. The top face of these blocks are coplanar and the blocks register with the plateaus 80a and 80b vertically. The body 75a also has a central projection 75d which is set back from the plane of the top face of the blocks so that the edge of the knife 80c does not come into touch with the projection 75d. The body 75a may be made from suitable elastic material, and the blocks 75b and 75c may be made from heat-resistant elastomers, such as silicon rubber, heat-resistant synthetic rubber or the like.

The dies shown are particularly useful for the heat-sealing of wrapping material which is heat-shrinkable plastic film. It was found that coating the surface of the upper die 80 and the knife 80c with fluorocarbon resin is particularly effective to prevent adhesion of some heat-shrinkable films, such as polyvinyl chloride film, which have lower melting points approaching the temperature to which the body of the upper die 80 is heated. Such temperature depends upon the wrapping material, but to give an example, when polyvinyl chloride film is used as wrapping material, the upper die including the knife is constantly heated to a temperature below the melting point of polyvinyl chloride, thus between 130° and 160° C. The knife temperature may be lower than the body of the upper die. The heating may be effected in any suitable manner, as by making the die body in two parts as mentioned above and inserting a row of heater bars therebetween which are clamped in position by set screws. In one example, the surface of the die and the knife was coated with tetrafluoroethylene resin film which is commercially available under the trademark of Teflon.

In use, when the dies are moved toward each other in the manner as described with reference to FIG. 4, the web material is pressed at two locations between engaging plateaus 80a and 80b and blocks 75b and 75c, respectively, and the resulting tension in the web material facilitates cutting by the knife 80c. At the same time, transverse seals are made on both sides of the cut. It was found that when the knife edge extends from than 1 mm. beyond the plane of the plateaus 80a and 80b, the resulting tension is too large to ensure sound seals. Conversely, when the knife edge did not extend more than 0.5 mm. beyond this plane, the knife failed to cut the film because of insufficient tension.

The packaging machine shown in FIGS. 1 to 5 is particularly adapted, although not exclusively, for wrapping articles with heat-shrinkable films. It is conventional that a package of heat-shrinkable film and enclosing an article is passed through a tunnel where heat is applied to the entire package to cause heat-shrinkage thereof. Such close packing may sometimes exert an excessively strong force of contraction to the packed articles, for example, eggs, fruits, cakes, deformable boxes, woolen yarns, and therefore, was not adapted to the packages of such articles. Also certain articles such as a roll of cloth have an external surface which is readily deformed by the force of contraction to produce creases or wrinkles which degrades the appearance of the packaged article. As is well known, such close packing involves preparation of perforations in the film of the heat-shrinkable wrapping material for exhaust of air. An attempt has been made to suppress the contraction by choosing the size of the perforation small so that some amount of air may be left enclosed in the package to partly oppose the force of contraction. However, it is apparent that the size of perforations must be varied in dependence upon the size of articles to be packed. In addition, the amount of air enclosed in the heat-shrinked package is uncontrollable, so that finish of the package was not uniform. Another remedy of this problem was to use an excessive amount of wrapping material, which, however, was not only uneconomical, but also failed to prepare a satisfactory package.

Figures 6, 6A:
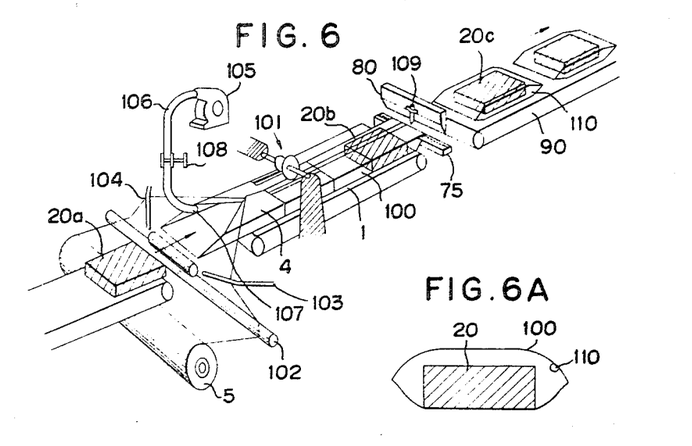
FIG. 6 is a perspective view of the machine incorporating a blower.
FIG. 6A is a longitudinal section of a package in a heating tunnel.

According to the invention, the above problem is overcome by continuously forcing air into a blank package as it is prepared, by use of a blower. When the transverse sealing and cutting of the blank package are effected, a perforation is simultaneously formed in the package by a needle which is secured to the cutting and sealing dies such as shown in FIG. 6. A part of enclosed air escapes through the perforation, but when the package passes through the heating tunnel, air tends to expand and its pressure acting on the package film from within partly suppresses the force of contraction to leave some space between the film and the article when the package leaves the tunnel.

Referring to FIG. 6, the arrangement for suppressing a close packing is schematically shown in perspective. The principal part is similar to the packaging machine shown in FIGS. 1 and 2 and therefore, like parts are designated by same reference numeral. Web of wrapping material supplied from the roll 5 is formed by the former 4 into a parallelopiped blank package 100 which has its longitudinal seal made by a sealing device 101 which corresponds to the device 10 of FIGS. 1 and 2. Suitable guide bars 102 to 104 are shown to be arranged between the roll 5 and the former 4. A blower 105 is secured to the machine frame at a position above the former and is connected with a conduit 106 which has its open end 107 directed to the inlet opening of the former 4. A control valve 108 is inserted in the conduit for adjustment of air pressure and its quantity. In FIG. 6, the upper die 80 and lower die 75 are shown in their position when the cutting and sealing step has been finished. The upper die carries a needle 109 on the side thereof by any suitable means. The needle is arranged on the upper die so that it forms a perforation 110 in the web when the both dies engage. It will be appreciated that the forward end of the parallelopiped blank package 100 is always closed either by the sealed end adjacent to the article 20b, or by the sealed end adjacent to the article 20c before the dies cut the web between the articles 20b and 20c. Thus forced air supply to the blank package maintains it in an inflated condition, and this additionally facilitates introduction of an article 20a into the blank package. The pressure and quantity of air supply is chosen so that the internal pressure of the package is slightly higher than the atmospheric pressure. Any excessive amount of air can flow out from the inlet opening of the package and therefore, the control of the valve 108 is not critical. Although the overlapping side parts of the web are subjected to the differential air pressure before they are sealed together by the device 101, it was found that because of small value of the differential pressure and small length of the notch 8, the device 101 could make a satisfactory seal without any additional provision. However, a wire may be spanned in the notch 8 across the web to prevent its side parts from being moved out of overlapping relationship. FIG. 6A shows the shape of a package enclosing an article and placed in a heating tunnel. Due to temperature rise, air in the package tends to expand, and this inner pressure resists the force of contraction caused by heat-shrinkage of the film. After leaving the tunnel, air gradually escapes through the perforation.

Figure 7:
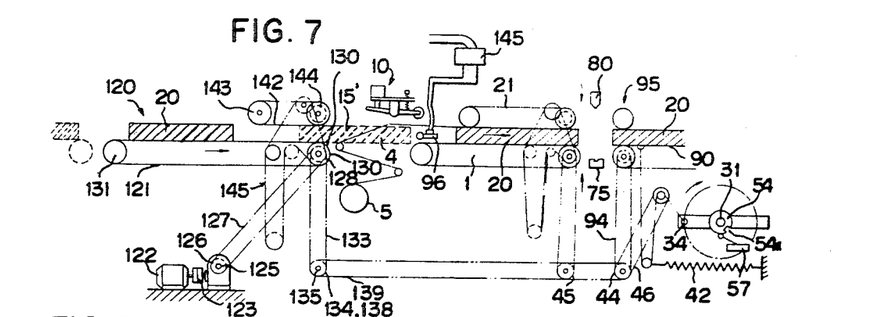
FIG. 7 is a schematic elevation of the feeder mechanism, the latter being shown in combination with the packaging machine shown in FIG. 1.
Figure 8:
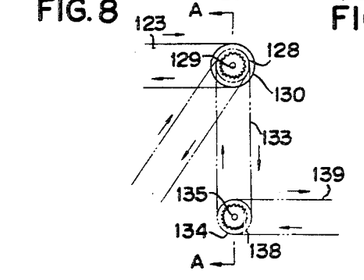
FIG. 8 is a schematic diagram illustrating the operation of the mechanism shown in FIG. 7.
Figure 9:
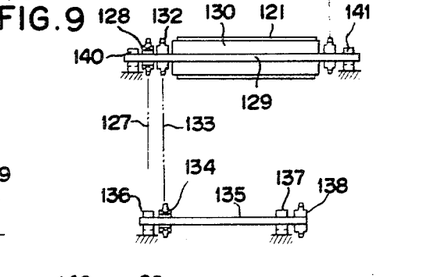
FIG. 9 is a section along the line A—A in FIG. 8.

Referring to FIG. 7, there is shown a feeder mechanism 120 for associated use with the packaging machine shown in FIG. 1 to 5. The feeder mechanism should supply articles to be packed to the packaging machine at a rate which does not disturb its operation. In order to achieve this purpose, the feeder mechanism 120 comprises an endless conveyor belt 121 which is driven alternately, named, by the motor of the packaging machine through its transmission assembly at one time, and by a separate motor 122, which will be referred to herein as second motor, at the other time. FIG. 7 also shows a substantial part of the packaging machine, of which various parts are designated by same reference characters put to corresponding parts in FIGS. 1 to 5. It is to be noted that in FIG. 7, the cam plate 54 is shown to be mounted on the transmission shaft 31 rather than on the control shaft 51 as shown in FIG. 1 and 3. The shaft of the second motor 122 is connected through an electromagnetic clutch 123 to a variable reduction gear 124, on the output shaft 125 of which is mounted a chain sprocket wheel 126. A chain belt 127 runs around the sprocket wheel 126 and another sprocket wheel 128 which is on the shaft 129 of a drive roller 130 for the conveyor belt 121, the other roller for the belt being shown at 131. The shaft 129 is rotatably supported by bearings 140 and 141 secured to the machine frame. As shown in FIGS. 8 and 9, the sprocket wheel 128 incorporates therein a pawl and ratchet mechanism of the type shown in FIG. 1A for connection with the shaft 129. The shaft 129 has another sprocket wheel 132 mounted thereon and a chain belt 133 extends around the latter and a chain sprocket wheel 134 which is carried on an intermediate transmission shaft 135 rotatably supported by a pair of bearings 136 and 137 fixed on the machine frame. The sprocket wheel 134 also incorporates therein, for connection with the shaft 135, a pawl and ratchet mechanism of the type which is similar to that shown in FIG. 1A except that the direction of effective transmission is from the shaft 135 to the wheel 134 only. On the other end of the shaft 135 is mounted a chain sprocket 138 and this shaft is adapted to be driven from the transmission assembly of the packaging machine through driving engagement between the sprocket 138 and a link belt 139, the latter being in driving engagement with a sprocket wheel mounted on the same shaft as the chain sprocket 45 of the packaging machine.

During operation, the sprocket wheels 128 and 134 act as one-way clutches. Thus the sprocket wheel 128 drives the shaft 129 clockwise, as viewed in FIG. 8 when the clutch 123 is actuated, but it freely rotates on the shaft 129 when the latter is driven from the packaging machine through the chain belt 133 and sprocket wheel 132. Similarly, the sprocket wheel 134 prevents the drive from the second motor 122 from being transmitted to the transmission assembly of the packaging machine by freely rotating on its shaft 135, but permits the drive from the transmission assembly to be effectively transmitted to the shaft 129 in a direction to rotate it clockwise, as viewed in FIG. 8, when the shaft 129 is not positively driven from the second motor 122.

For positive feed of the articles in the feeder mechanism, an upper, endless conveyor belt 142 is arranged above the conveyor belt 121 to run around a pair of rollers 143 and 144 which are carried by their shafts rotatably supported by the machine frame. It is convenient to mount these shafts adjustably in the vertical direction so that the lower span of the belt 142 may engage the top of articles of various heights or thickness. One of the rollers, 144, is adapted to be driven at the same speed as the roller 130 by means of a link belt system, generally shown at 145, the link belt engaging with a sprocket wheel shown on the right-hand end of the shaft 129 in FIG. 9 without designation. The system 145 is similar to the corresponding one shown in FIG. 1 which includes parts 24 to 27 and which drives the roller 23, and therefore, it will not be described in detail. In FIG. 7, the photoconductive cell 96 is shown to be connected in circuit with a switching device 145 which is connected to its energizing power source not shown.

Figures 10, 11:
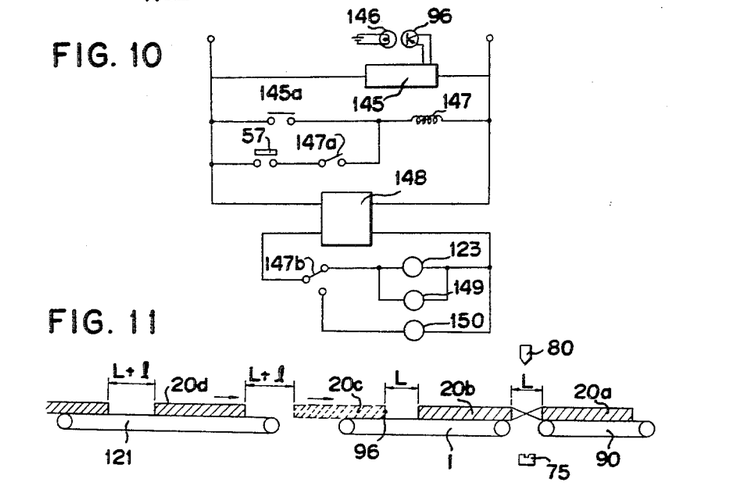
FIG. 10 is a wiring diagram of the control circuit.
FIG. 11 is a schematic view illustrating the operation of the packaging machine in combination with the feeder mechanism.

FIG. 10 shows a wiring diagram of a control circuit which controls proper operation of the packaging machine and the feeder mechanism. A light source 146 connected to a battery is arranged to oppose, across the conveyor belt 1, the photoconductive cell shown in the form of a photodiode 96. The latter is connected in circuit with the switching device 145 in such a manner that when an article 20 to be packaged intercepts the light path from the light source 146 to the photodiode 96, the device acts to close its normally open contact 145a. Thus the control circuit is shown in the state when there is no article that intercepts the light path. The device 145 is shown to be connected across an A.C. source shown by a pair of terminals not designated. A relay coil 147 having its contacts 147a and 147b associated therewith is connected in series with the contact 145a across the A.C. source. The contact 145a is bridged by a series connection of the contact 147a and the limit switch 57. The movable arm of the contact 147b is connected to one output terminal of a rectifier 148, and to the other end of the rectifier output are connected one end of a solenoid actuating the clutch 123, one end of a solenoid 149 actuating an electromagnetic brake for the transmission shaft 31 of the packaging machine and one end of a solenoid 150 actuating the clutch interposed between the motor 30 and the transmission shaft 31 of the packaging machine. The other ends of the solenoids 123 and 149 are connected together to the normally closed contact of the relay contact 147b, while the other end of the solenoid 150 is connected to the normally open contact of the latter.

The operation of the feeder mechanism combined with the packaging machine is as follows:

Assuming that the whole machine is in the state indicated in FIG. 10, the drive for the packaging machine is interrupted and its transmission assembly is reset with the cam plate 54 at a position where the roller 55 drops into the notch 54a of the cam plate 54 (FIG. 3), whereby the limit switch 57 is off as shown in FIG. 10. At this time, the bolt 34 on the cross-bar 32 occupies its position nearest to the sprocket wheel 36. The cam plate 58 has advanced 90° clockwise from its position shown in FIG. 3, but has not advanced so far to actuate the limit switch 59 so that the solenoid 11 remains to be energized to keep the heat roller 17 up. An article 20 staying at rest on the conveyor belt 1 is enclosed in a blank package which has its right-hand end (FIG. 1) sealed and cut from its preceding section by the dies 80 and 75 which are held fully apart at this time.

Since the clutch 123 is actuated, the shaft 129 is driven from the second motor 122 and the conveyor belts 121 and 142 are continuously running. When an article 20 is transferred onto the belt 121, it is carried on the belt 121 and between the belts 121 and 142 to enter the former 4. The forward end of the conveyor belt 121 is positioned adjacent to the inlet end of the former 4, and as the article continues to be fed by the belt 121, it slides on the plastic web in the former to reach a position where its forward end intercepts the light path between the light source 146 and the photodiode 96.

Thereupon the switching device 145 associated with the photodiode is energized to close its contact 145a, whereby the relay coil 147 is energized to close its contact 147a and to switch its contact 147b to the other position simultaneously. The clutch 123 is deenergized and the solenoid 150 is energized to start the operation of the packaging machine. Shortly after the transmission shaft 31 has started to rotate, the cam plate 54 turns the limit switch 57 on. This completes a self-holding circuit for the relay 147, which therefore remains to be energized even when the trailing end of the article has passed by the photodiode 96 and the relay contact 145a has been opened. Also at a short interval after the shaft 31 and hence the control shaft 51 have started to rotate, the cam plate 58 turns the limit switch 59 off, thereby deenergizing the solenoid 11 to press down the heat-roller 17 for longitudinal sealing of the overlapping side parts of the web. The conveyor belts 1, 21 and 90 are driven by the rotating bolt 34 to bring the article which actuated the photodiode to a position adjacent to the cutting and sealing station, while the preceding article is carried through the station onto the belt 90. At the same time, the shaft 129 carrying the roller 130 for the conveyor belt 121 of the feeder mechanism is driven through the link belt 139, one-way clutch 134, chain belt 133 and sprocket wheel 132 to run the conveyor belt 121 at the same speed as the conveyor belt 1. It will be appreciated that this prevents oversupply of articles to the packaging machine. At 180° of rotation of the shaft 31 from its starting point, the drive to the conveyor belts terminates, and during its further rotation, the pair of dies 80 and 75 are operated to make a pair of transverse seals in the web and to cut it between these seals. The limit switch 59 is again turned on toward 180° of rotation to lift up the heat-roller 17 when the blank package ceases to be moved. Just prior to the completion of one revolution of the shaft 31, the limit switch 57 is turned off by the notch 54a of the cam plate 54. When this occurs, the relay coil 147 (FIG. 10) is deenergized to reset its contacts 147a and 147b, whereupon the solenoid 150 is deenergized to deactuate the clutch associated with the transmission shaft 31. Simultaneously, the solenoid 149 actuates the electromagnetic brake for the shaft 31, which therefore stops. The clutch 123 is energized so that the conveyor belt 121 continues to rotate at the speed controlled by the reduction gear 124.

It will be noted that the operation of the packaging machine is always started by the presence of an article sensed by the photoconductive cell 96 and is completed when a blank package containing that article has its forward end sealed and separated from its preceding section. When articles of a different length are to be packaged, the machine can be readily adapted to that length by varying the amount of forward feed imparted to the conveyor belt 1. This is accomplished by changing the radial distance of the bolt 34 from the axis of the transmission shaft 31 and by longitudinally shifting the position of the photoconductive cell 96 along the path of movement of articles.

It will be also noted that the speed at which the conveyor belt 121 is driven from the second motor may be selected independently from the speed of the conveyor belt 1. The only requirement for properly operating the packaging machine in combination with the feeder mechanism is that a minimum distance is maintained between successive articles on the conveyor belt 121. FIG. 11 illustrates this condition. The distance between the conveyor belts 1 and 90, which represents the space alloted for the cutting and sealing unit, is indicated by a reference character L. It is essential that for the proper operation of the unit or dies 80 and 75, an article 20a on the belt 90 is separated from its following article 20b on the belt 1, at least by a distance of L. Since the relative position of the articles does not change on the belts 1 and 90, it is necessary that by the time when the belt 1 has completed its forward feed to the article 20b, the next article 20c does not reach within the distance L from the trailing edge of the article 20b. Therefore, it is suitable to position the photoconductive cell 96 at a distance of L plus the length of the article set back from the forward end of the conveyor belt 1. In practice, it will be convenient to supply articles to the packaging machine with minimum separation of $L+l$, $l$ being a small allowance. As long as articles are supplied with this separation, the packaging machine automatically starts and stops to produce complete packages of articles without requiring any particular attention of operating personnel.

When the machine stops, the feeder mechaninsm is operated by the second motor to convey articles until they reach the photoconductive cell 96, which in turn starts the operation of the packaging machine. Therefore, it will be understood that the combination of the packaging machine and the feeder mechanism is equally applicable where the manufacturing of articles is continuous or intermittent.

While the invention has been illustrated and described with reference to particular embodiments thereof, it should be apparent that various modifications are possible within the scope of the invention that is defined in the appended claims.

What is claimed is:

1. An automatic packaging machine comprising a motor, a transmission shaft adapted to be driven at a constant speed from the motor, a cross-bar rigidly mounted on the transmission shaft for rotation therewith, fastening means adjustably clamped on the cross-bar, a link belt connected at its one end to the fastening means, the link belt engaging with a one-way clutch and having its other end secured to a stationary point, means coupled to the link belt between its other end and the one-way clutch for providing tension to the link belt, the one-way clutch being operative during a part of rotation of the transmission shaft when the length of the link belt between the fastening means and the one-way clutch is increasing, but being inoperative during the rest of rotation, an endless conveyor belt arranged between first and second positions along the path of movement of an article to be packaged, the conveyor belt being driven from the motor during the time when the one-way clutch is operative, a photoconductive cell adjustably arranged adjacent to the first position, the cell being operable, when the light path thereto from its opposing light source is intercepted by the article, to start driving the transmission shaft by the motor, and means for interrupting the drive to the transmission shaft after a predetermined angle of its rotation.

2. An automatic packaging machine according to claim 1, wherein said interrupting means comprises a cam driven by the transmission shaft.

3. An automatic packaging machine according to claim 1, further including a former of generally open-ended, parallelopiped shape having an inward, V-shaped notch in the top plate thereof, the former being supplied with a web of wrapping material at its inlet and adapted to form the web into a hollow parallelopiped packaging body into which an article to be packaged may be introduced.

4. An automatic packaging machine according to claim 3, wherein passing through the former, both sides of the web are held in overlapping relationship at the top of the packaging body, the machine further including a sealing device positioned above the former and having a solenoid-actuated heat-roller, and the former having a flat extension from its top plate, a notch being formed between the top plate and the extension for allowing passage therethrough of the top part of the packaging body, the arrangement being such that when the solenoid is actuated, the heat-roller is pressed down against the flat extension with the top part of the packaging body interposed between the heat-roller and the extension, whereby the overlapping parts of the web are heat-sealed by the heat-roller.

5. An automatic packaging machine according to claim 4, wherein the solenoid is actuated by another cam driven by the transmission shaft in such a manner that the heat-roller is pressed against the extension of the former during substantially the time when the one-way clutch is operative, whereby the overlapping parts of the web are sealed together to produce a longitudinal seal as the packaging body is conveyed on the conveyor belt together with an article contained in the body.

6. An automatic packaging machine according to claim 1, further including a cutting and sealing unit which is arranged adjacent to the second position, the unit comprising a pair of upper and lower dies which are adapted to be moved toward and away from each other during the time when the one-way clutch is inoperative, and which are adapted, when moved toward each other, to form a pair of closely spaced, parallel transverse seals in a packaging body and a cut between the transverse seals.

7. An automatic packaging machine according to claim 6, wherein the dies are operated by a cam plate rigidly mounted on the transmission shaft.

8. In an automatic packaging machine according to claim 1, a novel cutting and sealing unit which comprises a vertical hollow compartment arranged adjacent to the second position of the endless conveyor belt, the compartment having a pair of openings in opposing side walls thereof, the openings being in alignment with the path of movement of an article to be packaged on the conveyor belt for passage therethrough of the article and its surrounding blank packaging body, a pair of upper and lower dies slidably received in the compartment so that the dies can be moved toward and away from each other, a cam plate carried by the transmission shaft of the packaging machine, the cam plate having an annular groove therein, the radial distance of the groove from the axis of the transmission shaft being partly increased, the angle which the groove portion having the increased radial distance subtends being less than 180°, a follower member having a lateral projection which snugly fits in the groove and also having an elongated slot formed therein for sliding engagement with the transmission shaft, a connecting rod connected at its one end to the outer end of the follower member and having at its other end a sleeve slidably mounted thereon, the sleeve being normally biased away from said one end of the rod, a lever pivoted to the sleeve and having its one end connected to the upper die and its other end to the low die, through links, respectively.

9. An automatic packaging machine according to claim 1, further comprising a heatsealing and cutting unit operable on a blank package of plastic film, said unit comprising a pair of upper and lower dies, the upper dies having a pair of laterally spaced, coplanar plateaus at its end facing the lower die with a recess formed therebetween, the upper die carrying a knife which extends through the recess and has its cutting edge projecting 0.5 to 1.0 mm. beyond the plane defined by the plateaus, the lower die having a pair of bearing members of heat-resistant elastomers which coact with the plateaus to produce a pair of seals in the blank package placed therebetween when heat is applied to the upper die, the lower die having a slot between the bearing members to avoid contact with the cutting edge, the knife being operable, when the dies engage, to make a cut between the seals.

10. A die assembly according to claim 9, characterized in thtat the plateaus of the upper die and the cutting edge are coated by fluorocarbon resin.

11. A die assembly for heat-sealing and cutting a blank package of plastic film, comprising a pair of upper and lower dies, the upper dies having a pair of laterally spaced, coplanar plateaus at its end facing the lower die with a recess formed therebetween, the upper die carrying a knife which extends through the recess and has its cutting edge projecting 0.5 to 1.0 mm. beyond the plane defined by the plateaus, the lower die having a pair of bearing members of heat-resistant elastomers which coact with the plateaus to produce a pair of seals in the blank package placed therebetween when heat is applied to the upper die, the lower die having a slot between the bearing members to avoid contact with the cutting edge, the knife being operable, when the dies engage, to make a cut between the seals, said upper die carrying a needle at least on one side thereof for producing a perforation in the blank package as the dies seal it.

12. An automatic packaging machine according to claim 6, wherein an article to be packaged is introduced into an open-ended, parallelopiped packaging body of heat-shrinkable plastic film and wherein the upper die carries a needle at least on one side thereof for producing a perforation in the packaging body as the dies seal it, characterized by the provision of a blower for maintaining the space in the packaging body filled with pressurized air.

13. A feeder mechanism for supplying articles to be packaged to the packaging machine according to claim 1, comprising a separate endless conveyor belt having its delivery end arranged adjacent to a supply inlet of the packaging machine, the separate conveyor belt being alternately driven from the first mentioned motor of the packaging machine at one time, and from a second motor at a different time.

References Cited
UNITED STATES PATENTS

| | | | |
|---|---|---|---|
| 2,951,325 | 9/1960 | Podlesak et al. | 53—182 |
| 3,172,246 | 3/1965 | Ruff | 53—182 X |

THERON E. CONDON, Primary Examiner

E. F. DESMOND, Assistant Examiner

U.S. Cl. X.R.

53—182; 156—253; 198—21